(12) United States Patent
Fritz et al.

(10) Patent No.: US 6,480,797 B1
(45) Date of Patent: Nov. 12, 2002

(54) APPARATUS AND METHOD FOR CALIBRATION OF TRANSMISSION SHIFTERS

(75) Inventors: Todd W. Fritz, Kalamazoo, MI (US); Edward F. Handley, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/438,878

(22) Filed: Nov. 12, 1999

(51) Int. Cl.[7] .............................................. G01R 35/00
(52) U.S. Cl. ........................... 702/107; 702/94; 702/95; 702/104; 702/105; 702/150; 701/51; 701/58; 701/60; 74/473.1
(58) Field of Search ................................ 702/107, 104, 702/105, 94, 95, 150; 701/51, 58, 60; 318/650, 632, 610, 139, 254; 74/335, 336 R, 473.1

(56) References Cited

U.S. PATENT DOCUMENTS

| | | | |
|---|---|---|---|
| 5,281,902 A | * | 1/1994 | Edenlen et al. ............. 318/632 |
| 5,305,240 A | | 4/1994 | Davis et al. ............ 364/571.01 |
| 5,481,170 A | * | 1/1996 | Edenlen et al. ............. 318/650 |
| 6,301,537 B1 | * | 10/2001 | Walker ........................ 701/51 |

* cited by examiner

*Primary Examiner*—Bryan Bui
*Assistant Examiner*—Hien Vo
(74) *Attorney, Agent, or Firm*—Rader, Fishman & Grauer PLLC

(57) ABSTRACT

The present invention relates to an electronic control circuit and method for calibrating a transmission shifter and compensating for temperature variations. The electronic control circuit includes a power supply circuit comprising a bias voltage supply and a voltage surge protection circuit; at least one position sensor that receives a surge-protected output bias voltage from the power supply circuit; and a microprocessor that receives one or more position values from the position sensor relating to the physical position of the transmission shifter. The power supply circuit provides a calibration reference signal to said microprocessor. The voltage surge protection circuit protects the calibration reference signal against a surge voltage condition.

21 Claims, 3 Drawing Sheets

APPARATUS AND METHOD FOR CALIBRATION OF TRANSMISSION SHIFTERS

TECHNICAL FIELD OF THE INVENTION

The present invention relates to electrically actuated shifting mechanisms for automated mechanical transmissions. Specifically, the invention relates to an electronic circuit used to compensate for variations in the calibration of transmission shifters in automobiles or other vehicles as a result of temperature variations in the related electronic circuitry. The invention teaches an electronic circuit and method for providing a feedback calibration reference signal to a microprocessor from a power supply circuit that allows the microprocessor to account for variations in power supply temperature and resulting measurement variations during the shifter calibration process.

BACKGROUND

Electrically actuated X-Y shifting mechanisms for effecting gear shifts in automated mechanical transmissions are well known in the art. Such mechanisms require positioning calibration in order to insure that operation of the mechanism produces accurate gear shifts. Various methods and algorithms exist for calibrating X-Y shifting mechanisms, and one such method is taught in U.S. Pat. No. 5,350,240, which is assigned to the assignee of the present invention, and incorporated herein by reference. The calibration algorithms are typically performed by a microprocessor that uses input values from one or more position sensors.

However, the outputs of position sensors are sensitive to variations in the temperature of the related electronic circuitry and the input power supply. When the temperature of related electronic circuitry and power supply to the position sensors is elevated as compared to ambient conditions, the outputs of the position sensors will be different from the outputs when such components are at a lower temperature, even though the shifter is in the same physical position. Accordingly, it is well-known in the art for the microprocessor to utilize a calibration reference signal to compensate for these temperature-dependent offsets in position sensor outputs.

In the prior art, the calibration reference signal is taken directly from the bias voltage signal that powers the position sensors. However, most microprocessors are intolerant to voltage variants above 0.5 volts. Accordingly, most systems require voltage surge protection circuitry between the calibration signal and the microprocessor. One of the problems with this methodology is that the additional circuitry may itself offset the calibration reference signal as a result of its own variations in temperature. Thus, it is desirable to have an electronic calibration circuit that includes a calibration reference signal that is treated as one of the control variables measured at the same time as the position sensors and fed directly to the microprocessor without any intervening circuitry.

SUMMARY OF THE INVENTION

The present invention is directed to an electronic circuit used to calibrate a gear shifter in a transmission. Specifically, the present invention compensates for variations in the measurements provided by the transmission position sensors resulting from differences in the temperatures of the related electronic components at different times. For example, for a vehicle transmission shifter calibrated when the vehicle and related electronic circuitry are at an elevated temperature as compared to ambient conditions, the measurements provided by the shifter position sensors will be different than when the vehicle and related circuitry are at a lower temperature, even though the transmission shifter is in the same physical position. The present invention compensates for that difference and adjusts the transmission shifter position data based upon a feedback calibration reference signal provided to the microprocessor from the power supply circuit.

The electronic circuit of the present invention includes a microprocessor for implementing the calibration algorithm for physically adjusting the transmission shifter relative to the various inner wall surfaces of the shift block. The present invention can be used in connection with a variety of calibration algorithms. One such algorithm is taught in U.S. Pat. No. 5,305,240. As input to the calibration algorithm, the microprocessor receives shifter position data from one or more shifter position sensors. The position sensors are powered by a power supply circuit, which includes a bias voltage supply and a voltage surge protection circuit. The voltage surge protection circuit is disposed between the bias voltage supply and the position sensors to protect the bias voltage supply and position sensors from short circuits or transient voltage or surge voltage conditions. A calibration reference signal is measured from the voltage surge protection circuit. The calibration reference signal is derived by scaling the output bias voltage supplied from the bias voltage supply to the position sensors. Because most microprocessors are intolerant to inputs that vary more than 0.5 volts, it is important that microprocessor inputs be protected from voltage surge or transient conditions. However, in this invention, because the calibration reference signal is produced by the voltage surge protection circuit, no additional voltage surge protection is necessary to protect the microprocessor from large swings in input voltage from the calibration reference signal. Accordingly, the calibration reference signal is input directly from the voltage surge protection circuit to the microprocessor through an A-D converter. A corresponding calibration reference signal is fed back to the microprocessor each time the position sensors measure and input position data to the microprocessor.

The voltage surge protection circuit of the present invention includes a switch network that initially determines if the position sensors are connected to the circuit and whether a short-circuit or excess current condition exists. If there is no short-circuit or excess current condition, the switch network permits the system to "power up". If a short-circuit or excess current condition does exist, the switch network prevents the system power supply from providing power to the system. Thus, the bias voltage supply is protected from possible damage from the short-circuit or excess current condition.

The voltage surge protection circuit also includes an output current control circuit for controlling the current provided from the bias voltage supply during normal operation and for cutting off the bias voltage supply if a short-circuit or excess current condition is detected during operation. In a preferred embodiment, the output current control circuit includes a bi-polar junction output transistor connected between the system power supply and the load device. The output current of the output transistor depends upon a drive current control signal, which is the output of a drive current control circuit. Preferably, the drive current control circuit includes a pre-drive transistor, which controls the input current to the base of the output transistor, which in turn dictates the output current supplied to the position sensors.

During normal operation (i.e., when there is no short-circuit or an excess current condition), the pre-drive transistor determines a stable level of output current to deliver to the position sensors by receiving feedback from the output transistor. It is generally preferred that the output voltage across the position sensors be compared to a pre-determined reference voltage by an operational amplifier. The output of the operational amplifier provides the feedback to and activates the pre-drive transistor. As the output voltage across the load device approaches the pre-determined reference voltage, the currents through the pre-drive transistor and the output transistor decrease until the output voltage stabilizes.

If a short-circuit or excess current situation occurs, the drive current control signal deactivates the output transistor, cutting off all current flow to the position sensors. The output transistor remains deactivated until the short-circuit or excess current situation is eliminated, at which time, the switch network reactivates the circuit.

During system operation, the position sensors measure the physical position of the transmission shifter and input the position data to the microprocessor through an A-D converter. When the vehicle is turned off, the last set of shifter position data and the corresponding calibration reference signal are stored in a memory device. When the vehicle is turned back on and the vehicle electronics are at an ambient temperature ("cold"), the shifter position data measured by the sensors will be different from that which was measured when the vehicle was at an elevated operational temperature ("hot"), even though the physical position of the transmission shifter is the same. The microprocessor compares the calibration reference signal stored when the "hot" position data was measured with the calibration reference signal measured when the vehicle is cold. Based upon the difference in the calibration reference signals, the microprocessor adjusts the stored shifter position data. Because the calibration reference signal is input directly to the microprocessor from the voltage surge protection circuit, the potential for offset variants of the calibration reference signal resulting from additional surge protection circuitry between the calibration reference signal and the microprocessor is eliminated.

DETAILED DESCRIPTION OF THE PREFERRED EMBODIMENT

Figure 1:
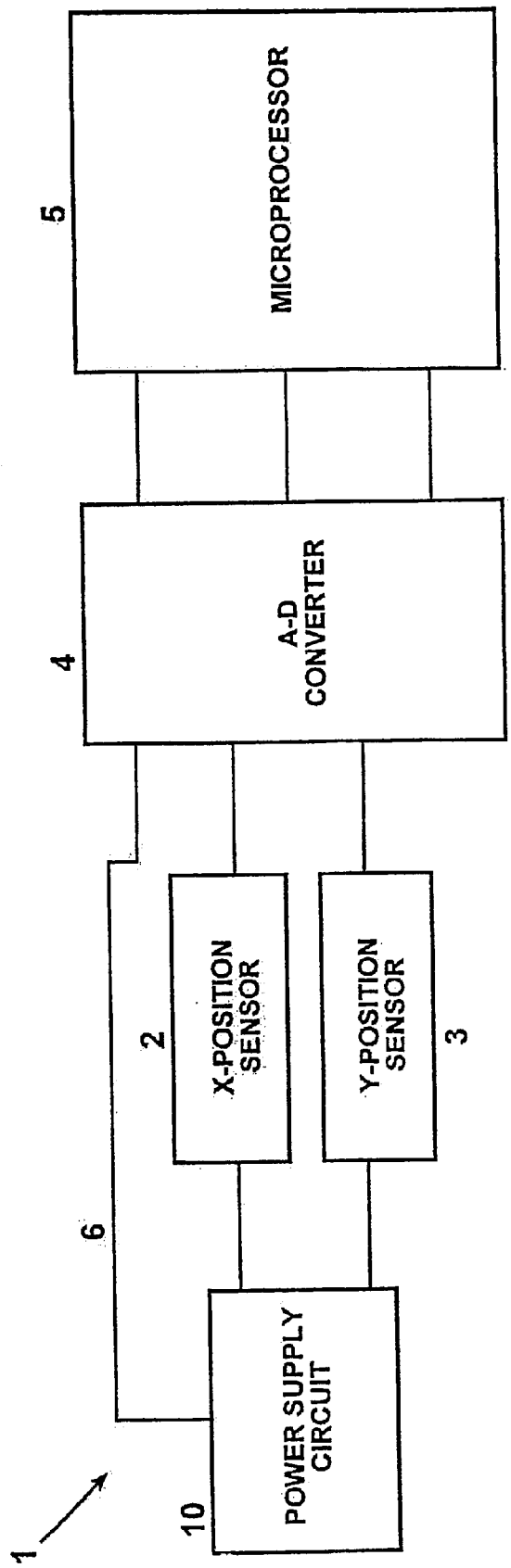
FIG. 1 shows a blocked diagram of the electronic circuit according to a preferred embodiment of the present invention.
Figure 2:
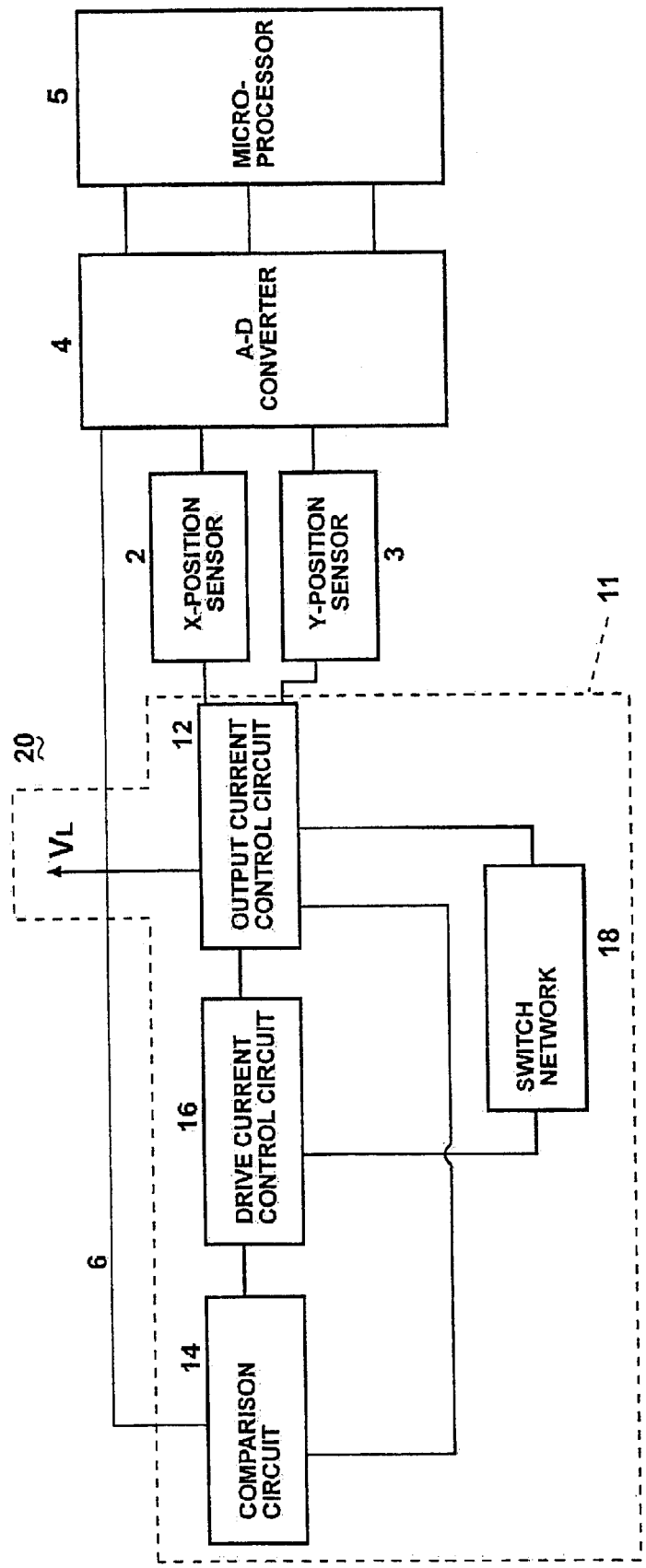
FIG. 2 shows a blocked diagram of the power supply circuit according to a preferred embodiment of the present invention.

With reference to FIG. 1 and FIG. 2, an electronic circuit 1 according to a preferred embodiment of the invention comprises a power supply circuit 10 which itself comprises a bias voltage supply 20 with a voltage surge protection circuit 11. As discussed in greater detail below, circuit 10 includes an output current control circuit 12, a comparison circuit 14, a drive current control circuit 16 and a switch network 18. The electronic circuit 1 also comprises an x-position sensor 2 and a y-position sensor 3, which are both powered by the power supply circuit 10 and provide position data to an A-D converter 4 and microprocessor 5. The power supply circuit 10, and specifically the comparison circuit 14 of surge protection circuit 10, provides a calibration reference signal 6 to the A-D converter 4 and microprocessor 5.

With reference to FIG. 2, power supply circuit 10, according to a preferred embodiment of the invention, comprises a bias voltage supply 20; an output current control circuit 12 connected between the bias voltage supply and position sensors 2, 3 for controlling the level of output current supplied to the sensors 2, 3; a comparison circuit 14 for comparing the voltage across the sensors 2, 3 with a pre-determined reference voltage to provide a voltage stabilization control signal; a drive current control circuit 16 responsive to the stabilization control signal for providing a drive current control signal to the output current control circuit 12; and a switch network 18 connected to the drive current control circuit 16 to selectively activate the power supply circuit 10. In the disclosed embodiment, it is assumed that the bias voltage supply 20 is a common automobile 12-volt battery.

Figure 3:
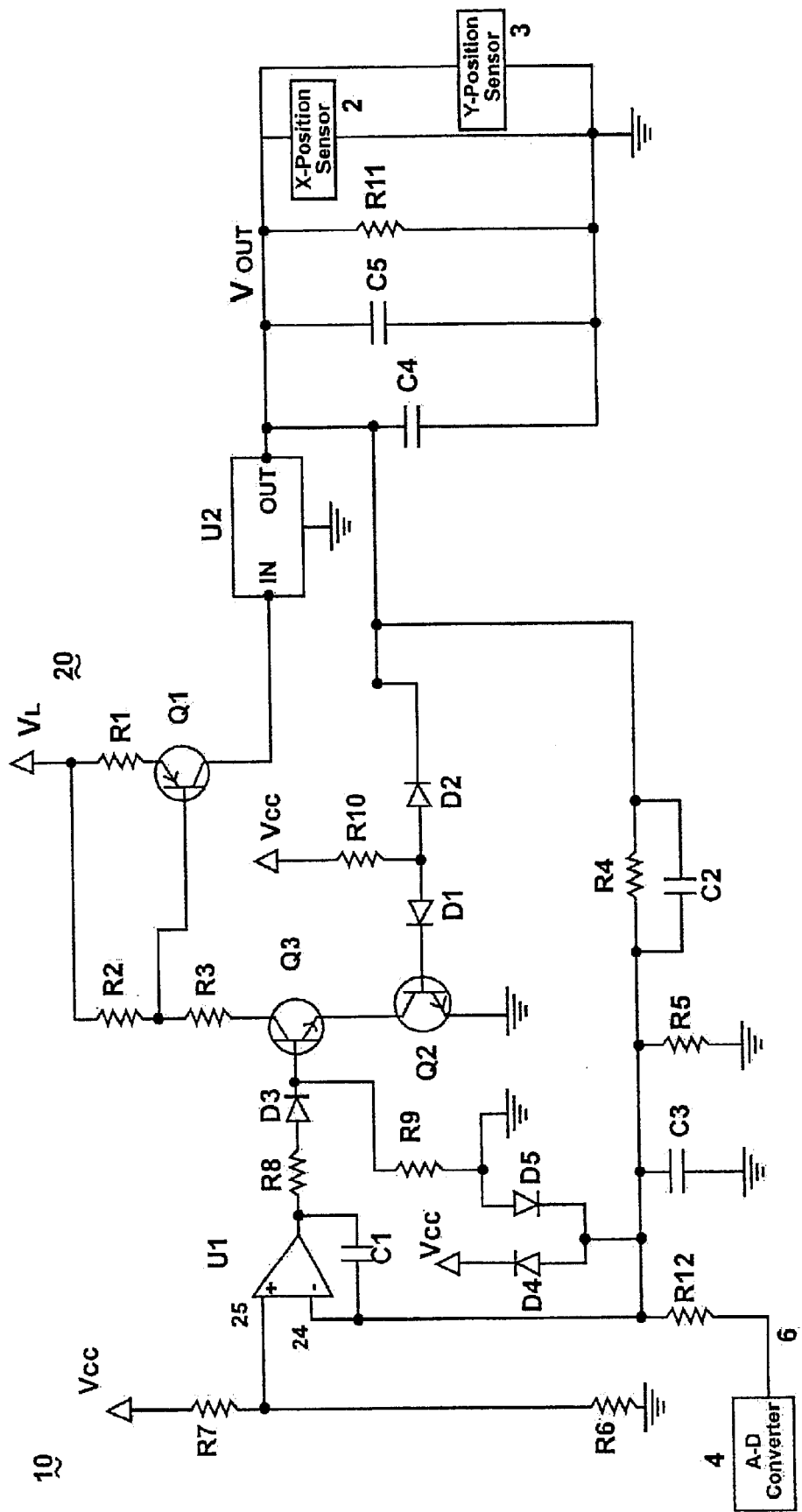
FIG. 3 shows a schematic diagram of the power supply circuit according to a preferred embodiment of the present invention.

Referring to FIG. 3, which shows circuit 10 in detail, bias voltage supply 20 with output potential $V_L$ provides output current to sensors 2, 3 through a resistor R1 and an output transistor Q1, which together comprise the output current control circuit 12. The output potential Vout across the sensors 2, 3 is scaled by a voltage divider R4/R5 comprising resistors R4 and R5. A reference voltage Vcc is scaled by a voltage divider R6/R7 comprising resistors R6 and R7. The scaled output voltage Vout and the scaled reference voltage Vcc comprise inverting 24 and non-inverting 25 inputs, respectively, to an operational amplifier U1. Together, the R4/R5 voltage divider, the R6/R7 voltage divider, and operation amplifier U1 comprise the comparison circuit 14. Calibration reference signal 6 is taken as the output of the R4/R5 voltage divider.

The output of U1 provides current to the base terminal of a pre-drive transistor Q3. The collector terminal of transistor Q3 is connected to resistor R3, which is connected to resistor R2, which is connected to the bias voltage supply 20. The potential at the R2/R3 node provides the input to the base terminal of transistor Q1. Resistor R2, R3, and transistor Q3 comprise the drive current control circuit 16. Transistor Q1 comprises the output current control circuit 12.

The switch network 18 comprises resistor R10, diodes D1 and D2, and switch transistor Q2. The emitter terminal of transistor Q3 is connected to the collector terminal of switch transistor Q2, and the emitter terminal of transistor Q2 is connected to ground. Vcc provides current through resistor R10 and diode D1 to the base terminal of transistor Q2. Vcc is also connected through resistor R10 and diode D2 to the Vout node.

When a short-circuit or excess current condition exists at the sensors 2, 3, the switch network 18 passes bias current from Vcc through transistor R10 and diode D2 because the Vout potential is close to zero. During this condition, transistor Q2 is inactive because there is insufficient current being delivered to the base of transistor Q2 to activate it. Accordingly, transistor Q2 cuts off the path to ground from transistor Q3, which essentially makes the power supply circuit 10 inactive and cuts off the bias voltage supply 20 from the sensors 2, 3. Thus, the power supply circuit 10 is prevented from "powering up" if there is a short-circuit or excess current condition.

Assuming that sensors 2, 3 provide sufficient resistance to reduce the load current and increase the Vout potential to a level greater than two diode junction voltage drops (diode D1 and the emitter of transistor Q2), transistor Q2 is activated, providing a current flow path from transistor Q3 to ground. The collector current of transistor Q3 is delivered from $V_L$ through resistors R2 and R3. As a result, a drive current is delivered to the base of transistor Q1, which causes output current to be delivered to the sensors 2, 3 and Vout to increase.

The rising potential at the Vout node is scaled by the R4/R5 voltage divider. In the preferred embodiment, resistors R4 and R5 are of equal magnitudes so as to scale Vout down by one half. Similarly, the Vcc potential is scaled down by the R6/R7 voltage divider. In the preferred embodiment, R6 and R7 are of equal magnitudes so as to scale Vcc by one half. The difference between the scaled Vcc and Vout potentials comprises the input to amplifier U1. The amplified difference is applied to the base of transistor Q3. The current supplied to the base of transistor Q3 controls the current drawn by the collector of transistor Q3 and thus the voltage drops across resistors R2 and R3. The potential at the R2/R3 node controls the activation of transistor Q1. As current is supplied to the sensors 2, 3 and the Vout potential increases, the difference voltage input to amplifier U1 decreases. As a result, emitter current of transistor Q3 decreases until a stable Vout potential is established. In the preferred embodiment, the stable Vout potential is approximately 5 volts. After a stable Vout is achieved, the system operates in steady state until a short-circuit or excess current condition is detected.

If a short-circuit or excess current condition occurs at the sensors 2, 3, the voltage surge protection circuit 11 shuts down and cuts the bias voltage supply 20 off from the short-circuit or excess current condition. In such a situation, the short-circuit or excess current condition at the sensors 2, 3 causes the current pushed through resistor R1 to increase and the voltage drop across R1 to increase. This removes potential for bias current from transistor Q3. As collector current of transistor Q3 decreases, the potential at the R2/R3 node decreases, driving transistor Q1 into cutoff. As cutoff is approached, emitter current of transistor Q1 is reduced, and the Vout potential approaches zero. As the Vout potential decreases, current from Vcc is drawn away from the base of transistor Q2 until the transistor is deactivated. Once the short-circuit or excess current condition is eliminated, the switch network 18 reactivates the circuit 10, as described above.

In a preferred embodiment of the invention, additional components are included in the control circuit 10 for such things as temperature compensation, device gain variances, general circuit stabilization, and protection against short circuits to high voltage or reverse polarity. Specifically, linear three-terminal voltage regulator U2 is connected between the collector of transistor Q1 and the Vout node. Regulator U2 provides a high precision output voltage and closely regulates Vout to a stable voltage while maintaining the short-circuit and over-current protection features of the invention. A resistor R11 is connected in parallel with sensors 2,3 to stabilize the circuit by dampening any overshooting of the 5-volt stabilized Vout potential on initial power-up of the control circuit 10. Capacitors C4 and C5 are also connected in parallel with sensors 2, 3 and resistor R11 to prevent the control circuit 10 from oscillating as a result of the high gain in the system. Capacitor C3 is connected between the inverting input node of amplifier U1 and ground, and it acts as a filter against negative input to the system. A diode D3 is connected between a resistor R8 and the base terminal of transistor Q3 to prevent back leakage from the collector of transistor Q3 when transistor Q2 cuts off. The base terminal of transistor Q3 is connected to reference ground through a resistor R9, and resistor R9 acts as an emitter follower to stabilize potential gain at high temperatures. A diode D4 is connected between the inverting input to amplifier U1 and Vcc to clamp the Vout potential at its stable voltage and prevent damage from electrostatic discharge. A diode D5 is connected between an inverting input node 24 of amplifier U1 and resistor R9, providing a flow path from the base of transistor Q3 to the inverting input node 24 and preventing back leakage. Diode D5 also prevents the bias on inverting input node 24 from exceeding one diode drop below ground. A capacitor C1 is connected across inverting input node 24 and an output terminal 26 of amplifier U1, and a capacitor C2 is connected in parallel with resistor R4. Capacitors C1 and C2 maintain a stable circuit by reducing unwanted oscillations. R12 is connected between the inverting input 24 and the A-D converter 4 to protect the A-D converter 4 from potential electrostatic discharge damage.

During operation, power supply circuit 10 provides power to sensors 2, 3 from bias voltage supply 20 through voltage surge protection circuit 11. Sensors 2, 3 detect the physical position of the transmission shifter (not shown) and provide related position data to microprocessor 5 through A-D converter 4. A calibration reference value is provided by calibration reference signal 6 to microprocessor 5 through A-D converter 4. Microprocessor 5 implements one of a variety of available calibration algorithms, such as the one disclosed in U.S. Pat. No. 5,305,240, for example. The position data for each measurement and the calibration reference value may be stored in memory devices (not shown).

When the vehicle is turned off, the vehicle, transmission and associated electronic circuitry all cool down to an ambient temperature. When the vehicle is turned back on, the bias voltage supply 20 has an offset in output bias voltage compared to when the bias voltage supply 20 was at an elevated temperature compared to ambient. The shift in output voltage causes the sensors 2, 3 to provide different position measurements to the microprocessor 5 even though the physical position of the transmission shifter is the same. When the vehicle is turned back on, calibration reference signal 6 provides a new calibration reference value to the microprocessor 5. The microprocessor 5 compares the new calibration reference value to the previous calibration reference value. Based upon the difference between the two calibration reference values, the microprocessor adjusts the stored position values provided by the sensors 2, 3 according to methods that are well-known in the art.

One of the benefits of the present invention is that calibration reference signal 6 is directly derived from Vout and it is protected against voltage surges and transients by voltage surge protection circuit 11. Thus, the need for additional surge protection circuitry between the calibration reference signal 6 and the microprocessor 5 is eliminated, which in turn eliminates the undesirable possibility of calibration reference signal 6 being offset by additional surge protection circuitry prior to reaching microprocessor 5. As a result, the adjustments to the position data made by the microprocessor 5 are more accurate and the system overall becomes more stable as compared to prior art systems.

Furthermore, the present invention provides a mechanism for monitoring and adjusting Vout based upon the feedback signal provided to the base of transistor Q3. Because the feedback signal provided to the base of transistor Q3 is a function of inverting input 24 of amplifier U1, any load or temperature effects of microprocessor 5 on calibration signal 6 will affect the feedback signal provided to the base of transistor Q3 and assist to stabilize the system.

While preferred embodiments of the present invention have been described herein, it is apparent that the basic construction can be altered to provide other embodiments which utilize the processes and compositions of this invention. Therefore, it will be appreciated that the scope of this invention is to be defined by the claims appended hereto rather than by the specific embodiments which have been presented hereinbefore by way of example.

What is claimed is:

1. An electronic circuit for calibrating the position of a transmission shifter, comprising:
   a power supply circuit comprising a bias voltage supply and a voltage surge protection circuit;
   at least one position sensor, said sensor receiving a surge-protected output bias voltage from said power supply circuit;
   a microprocessor that receives one or more position values from said position sensor relating to the physical position of the transmission shifter;
   said power supply circuit providing a calibration reference signal to said microprocessor; and
   said calibration reference signal being protected against a surge voltage condition by said voltage surge protection circuit.

2. The electronic circuit in claim 1, wherein said calibration reference signal is a function of said output bias voltage.

3. The electronic circuit in claim 2, wherein said power supply circuit includes a voltage divider circuit which scales said output bias voltage.

4. The electronic circuit in claim 3, wherein said voltage divider circuit scales said output bias voltage by one half.

5. The electronic circuit in claim 1, wherein said position sensors include at least an x-position sensor and a y-position sensor.

6. An electronic circuit for calibrating the position of a transmission shifter, comprising:
   a power supply circuit comprising a bias voltage supply and a voltage surge protection circuit;
   at least one position sensor, said sensor receiving a surge-protected output bias voltage from said power supply circuit;
   a microprocessor that receives one or more position values from said position sensor relating to the physical position of the transmission shifter;
   said power supply circuit providing a calibration reference signal to said microprocessor; and
   said calibration reference signal being protected against a surge voltage condition by said voltage surge protection circuit, wherein said voltage surge protection circuit comprises:
      an output current control means connected between said bias voltage supply and said position sensor for controlling the level of output current supplied to said position sensor;
      a comparing means for comparing the voltage across said position sensor with a pre-determined reference voltage to provide a voltage stabilization control signal;
      a drive current control signal means responsive to said voltage stabilization control signal for providing a drive current control signal to said output current control means; and
      a switch network connected to said means for providing a drive current control signal to selectively activate and deactivate said power supply control circuit.

7. The electronic circuit of claim 6, wherein said means for providing a drive current control signal comprises a pre-drive transistor.

8. The electronic circuit of claim 7, wherein said means for providing a drive current control signal further comprises first and second pre-drive resistors connected in series between said pre-drive transistor and said bias voltage supply.

9. The electronic circuit of claim 7, wherein said output current control means comprises an output transistor.

10. The electronic circuit of claim 7, wherein said comparing means comprises:
    an operational amplifier having two inputs and an output, and having its output connected to said pre-drive transistor as said stabilization control signal.

11. The electronic circuit of claim 10, wherein said comparing means further comprises:
    a first voltage divider circuit connected between said output current control means and a ground reference, and the output of said first voltage divider circuit connected to one of said inputs to said operational amplifier; and
    a second voltage divider circuit connected between a reference power supply and a ground reference, and the output of said second voltage divider circuit connected to the other of said inputs to said operational amplifier.

12. The electronic circuit of claim 11, wherein said calibration reference signal comprises the output of said first voltage divider circuit.

13. The electronic circuit of claim 7, wherein said switch network comprises:
    a switch transistor connected between said means for providing a drive current control signal and a ground reference;
    a first diode connected between said switch transistor and a logic power supply; and
    a second diode connected between said logic power supply and said sensors.

14. The electronic circuit of claim 6, wherein said output current control means comprises an output transistor.

15. The electronic circuit of claim 14, wherein said output current control means further comprises an output resistor connected in series between said bias voltage supply and said output transistor.

16. The electronic circuit of claim 6, wherein said switch network comprises:
    a switch transistor connected between said means for providing a drive current control signal and a ground reference;
    a first diode connected between said switch transistor and a logic power supply; and
    a second diode connected between said logic power supply and said sensors.

17. A method for calibrating a transmission shifter, comprising the steps of:
    providing an output bias voltage from a power supply circuit to one or more position sensors;
    said power supply circuit protecting said output bias voltage against voltage surge conditions;
    said position sensors measuring one or more position values relating to the physical position of the transmission shifter at a first point in time;
    establishing a calibration reference signal that is protected against voltage surge conditions by said power supply circuit;

measuring a first calibration reference value corresponding to said first point in time;

measuring a second calibration reference value corresponding to a second point in time;

comparing said first calibration reference value to said second calibration reference value; and adjusting said position values based upon the difference between said first calibration reference value and said second calibration reference value.

18. The method of claim 17, wherein said step of establishing a calibration reference signal comprises the step of scaling said output bias voltage.

19. The method of claim 18, wherein said output bias voltage is scaled down by approximately one half.

20. The method of claim 17, wherein said step of protecting said output bias voltage against voltage surge conditions comprises:

activating a switch transistor to provide an open current path from a pre-drive transistor to a ground reference;

providing a voltage stabilization control signal to said pre-drive transistor;

providing a drive current control signal and selectively activating an output transistor to control the level of output current supplied to the position sensors;

deactivating said output transistor if a voltage surge condition is detected at the position sensors.

21. The method of claim 20, wherein said step of providing a voltage stabilization control signal to said pre-drive transistor comprises comparing said output bias voltage supplied to the position sensors to a pre-determined reference voltage.

* * * * *